United States Patent

[11] 3,633,086

[72] Inventors Winfried Speth;
Rudolf Westermayer, both of Erlangen, Germany
[21] Appl. No. 10,256
[22] Filed Feb. 10, 1970
[45] Patented Jan. 4, 1972
[73] Assignee Siemens Aktiengesellschaft
Berlin and Munich, Germany
[32] Priority Feb. 12, 1969
[33] Germany
[31] P 19 06 836.1

[54] CLOSED-LOOP REGULATING SYSTEM FOR A CONTROL CIRCUIT WITH A CONTROL DRIVE
11 Claims, 10 Drawing Figs.
[52] U.S. Cl. .................................................. 318/489, 318/561, 318/649
[51] Int. Cl. .................................................. G05b 5/01
[50] Field of Search .......................................... 318/561, 611, 649, 489

[56] References Cited
UNITED STATES PATENTS

| | | | |
|---|---|---|---|
| 3,241,027 | 3/1966 | Albright ...................... | 318/561 |
| 3,283,230 | 11/1966 | Davies et al. ................ | 318/611 |
| 3,351,829 | 11/1967 | Quarnstrom ................. | 318/611 |
| 3,398,341 | 8/1968 | Dooley et al. ................ | 318/649 |

Primary Examiner—Benjamin Dobeck
Attorneys—Curt M. Avery, Arthur E. Wilfond, Herbert L. Lerner and Daniel J. Tick

ABSTRACT: A closed-loop regulating system comprises a regulator and a control drive limited in speed and acceleration. The control drive includes a position regulator. A subsidiary control loop controls the control drive and the amplitude of a magnitude depending upon the input signal of the position regulator inversely controls the amplification of the regulator.

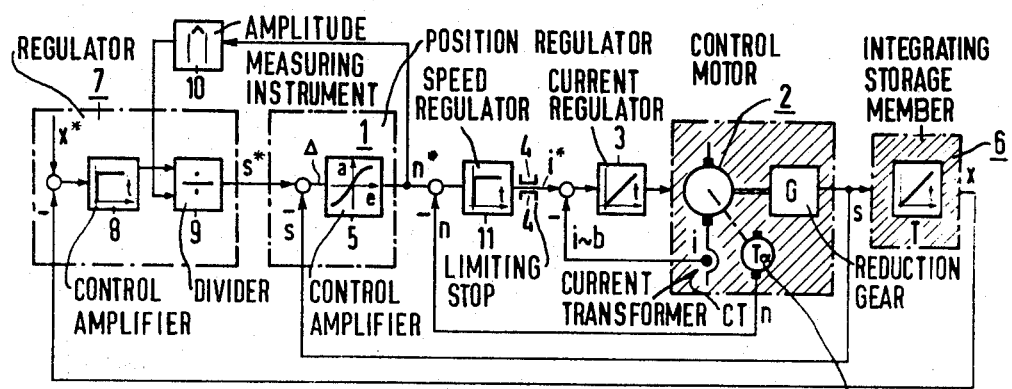
Fig. 1
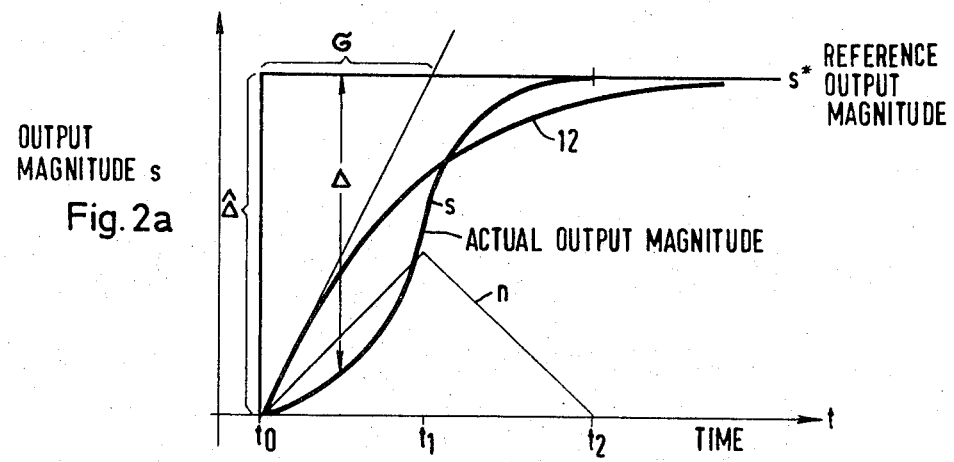
Fig. 2a
Fig. 2b
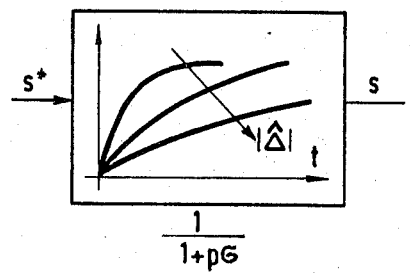
Fig. 2c

SUBSTITUTE
TIME CONSTANT $\sigma$
AND
OPTIMUM AMPLIFICATION V
OF CONTROL AMPLIFIER 8

CLOSED-LOOP REGULATING SYSTEM FOR A CONTROL CIRCUIT WITH A CONTROL DRIVE

DESCRIPTION OF THE INVENTION

The invention relates to a closed-loop regulating system. More particularly, the invention relates to a closed-loop regulating system for a control circuit with a control drive.

Many closed-loop regulating systems have control drives, the acceleration of velocity of which is limited. The reason for such limitations may be, for example, the efficiency or output limitations of the control motor or the saturation or modulation of a regulating amplifier or a relay element. The nonlinearity resulting from limitations does not impair stable and optimum control, as long as the control drive is operated by itself. If, however, the control drive is subsidiary to a regulating system with additional regulating loops, and if the regulating system has one or more storage members, the limitation of a subsidiary control drive makes optimum regulation questionable if one storage member is utilized. The dynamic stability of the entire regulating system is doubtful if a plurality of storage members are utilized. The foregoing possibilities occur especially in rapid regulating systems such as, for example, systems for regulating liquid or gaseous quantities or flows or for regulating the pressure of storage members, which systems utilize motor-driven valves. The same problems occur during the stabilization of ships or seagoing vessels which utilize adjustable or movable stabilizing floats, water transfer between tanks or track-guided vehicles. For economical reasons, the control members can never be adequately dimensioned with regard to their speed or adjustment rate and their driving torque, so as to compensate rapidly enough for the greatest torques to which the ship is subjected. The resulting limitation of the control drives causes the damping behavior of the regulating circuits to deteriorate and may impair the stability of the regulating system altogether. The control drives are subsidiary or ancillary to the regulating system.

A closed-loop control system, also called a feedback control system, is composed of two component portions, namely a controlling or regulating portion and a controlled or regulated system portion, the latter constituting the forward path of the quantity being regulated. For example, if the regulated quantity is steam pressure, the regulated system (main portion of the entire organization) includes the pressure supply and the pressure control valve from which this component system extends to the pressure output point at which the regulated steam pressure is to appear. The valve or other control member constitutes a branch point and responds to a command signal from the controlling or regulating system which includes a feedback from the output side of the regulated system to the branch point. The command signal varies the setting of the control member and thereby changes the quantity passing through the regulated system (forward path). At some point of the loop or at several points, or along a stretch of the loop, there may be introduced one or more disturbances, and these have a falsifying effect upon the control of the regulated system in which they become in effect amplified in the sense of a multiplication. That is, the control magnitude as well as any disturbance affecting the flow of the controlled quantity in the regulated system are much smaller in intensity than the changes in the quantity thus subjected to control, this resulting in the just-mentioned amplifying effect occurring in the regulated system.

Relative to the terminology used in the present disclosure and to the servo-type block diagrams shown in several illustrations of the accompanying drawings, reference may be had to "Feedback Control Systems" by Gille, Pelegrin and Decaulne, McGraw-Hill Book Co., New York, 1959, pages 7 to 22 and 771; also to "Analysis of Feedback Control Systems" by Bruns and Saunders, McGraw-Hill Book Co., New York, 1955, pages 1 to 6, 208 and 226; and to "Elektronische Analogiegeraete" by Dietrich Ernst, published in the German periodical "Regelungstechnik," Vol. 6, 1958, Nos. 3 to 6.

The "regulated quantity" is either the ultimate quantity itself (also called "actual" or "real" quantity), such as the pressure of the steam to be controlled or regulated in the example selected for illustration above, or the voltage of a regulated electrical system. However, the "regulated quantity" may also be constituted by some other physical quantity, usually an electrical voltage, that varies in proportion to, or in some other definite dependence upon, the ultimate quantity to be regulated. For example, if the steam pressure in the aforementioned example is measured electrically, a voltage varying in proportion to the actual steam pressure may constitute the "regulated quantity" in the meaning of the present disclosure; or if the speed of a vehicle is the actual quantity to be controlled or regulated, the speed-proportional voltage furnished from a tachometer generator may serve as the "regulated quantity." Because of the applicability of such secondarily variable quantities, the "regulated quantity" is often called "pilot" quantity or magnitude, regardless of whether or not it is the "actual" or "real" quantity. The datum or reference quantity is indicative of the value at which the regulated (pilot, real, or actual) quantity is to be maintained and is sometimes called "pattern" quantity, especially if it can be set to any chosen value, for example by adjusting a potentiometer or if it is varied in accordance with a given time program or with a change in temperature or other parameter.

The principal object of the invention is to provide a new and improved closed-loop regulating system.

An object of the invention is to provide a closed-loop regulating system which overcomes the disadvantages of known systems of similar type.

An object of the invention is to provide a closed-loop regulating system of simple structure which operates economically.

An object of the invention is to provide a closed-loop regulating system which functions with efficiency, effectiveness, precision and reliability.

In accordance with the invention, a closed-loop regulating system for a control circuit has a control loop for controlling the regulating system and a control drive which is limited in speed and acceleration. The regulating system comprises a regulator having an input and an output and providing amplification of a signal supplied thereto. A control drive limited in speed and acceleration includes a position regulator having an input connected to the output of the regulator and an output. A subsidiary control loop controls the control drive. The amplitude of a magnitude depending upon the input signal of the position regulator inversely controls the amplification of the regulator.

The regulator comprises an amplifier having an output and a divider having an input connected to the output of the amplifier and another input coupled to the output of the position regulator of the control drive.

The regulator comprises an amplifier having an output, a multiplier having an input connected to the output of the amplifier and another input, and a function generator having an output connected to the other input of the multiplier. The subsidiary control loop provides an input signal for the position regulator of the control drive and the input signal is supplied to the other input of the multiplier of the regulator. The function generator of the regulator comprises an electronic amplifier having a feedback circuit comprising a pair of parallel branches each of which includes a threshold diode connected in series circuit arrangement with a resistor, and means for biasing the threshold diodes with variable direct voltages.

The control drive includes a point contact rectifier for providing a control signal for the regulator and means for charging the rectifier with the input signal of the regulator.

The position regulator of the control drive comprises a control amplifier having an amplification which is inversely proportional to the output voltage of the amplifier and means for supplying the output signal of the control amplifier to the regulator to control the amplifier of the regulator.

In accordance with the invention, a close-loop regulating system for damping the rolling of a ship has a control loop for controlling the regulating system and a control drive which is limited in speed and acceleration. The regulating system comprises a regulator having an input and an output and providing amplification of a signal supplied thereto. A control drive limited in speed and acceleration includes a position regulator having an input connected to the output of the regulator, an output and a control amplifier connected between the input and output thereof. The control drive has an amplification inversely proportional to its output voltage. A point contact rectifier provides a control signal for the regulator. The rectifier is charged with the input signal of the regulator. A function generator is connected between the point contact rectifier and the regulator and has an amplification proportional to its output voltage. The function generator is charged via the point contact rectifier by the actual value of the regulator provided for the control drive. The function generator affects the amplification of the regulator. A subsidiary control loop including the rectifier and the function generator controls the control device. The amplitude of a magnitude depending upon the input signal of the position regulator inversely controls the amplification of the regulator.

The actual value of the regulator is a magnitude proportional to the roll velocity of the ship. An angle regulator for the roll angle of the ship is connected to the input of the regulator.

The aforedescribed input signal may constitute a magnitude derived from the reference value of the regulator which is ancillary to the control drive or may be derived from the pilot or actual value of said regulator or from the difference between the reference and pilot values. The basic principle of the invention is to decrease, automatically and in accordance with the degree of overcontrol of the control drive, the amplification of the regulator in order to provide preferred damping characteristics, even in overcontrolled systems.

The function generator permits the amplification of the regulator to be adjusted in a relatively simple manner to the pertaining conditions. The point contact rectifier is a simple means for deriving the maximum control signal, which is the input signal amplitude of the regulator of the control drive. The maximum control signal may be provided in various ways. It is expedient to design the control drive for optimum speed in a known manner and in a manner whereby in order to eliminate a control deviation, the control magnitude, which is limited toward one or the other side, is effective. To accomplish this, the position regulator comprises an amplifier having an amplification which is inversely proportional to its output voltage and which produces an output signal which affects the amplification of the regulator.

In order that the invention may be readily carried into effect, it will now be described with reference to the accompanying drawings, wherein:

FIG. 1 is a block diagram of an embodiment of the closed-loop regulating system of the invention;

FIGS. 2a, 2b and 2c illustrate the features of the closed-loop regulating system of the invention;

In the FIGS., the same components are identified by the same reference numerals.

Figure 3:
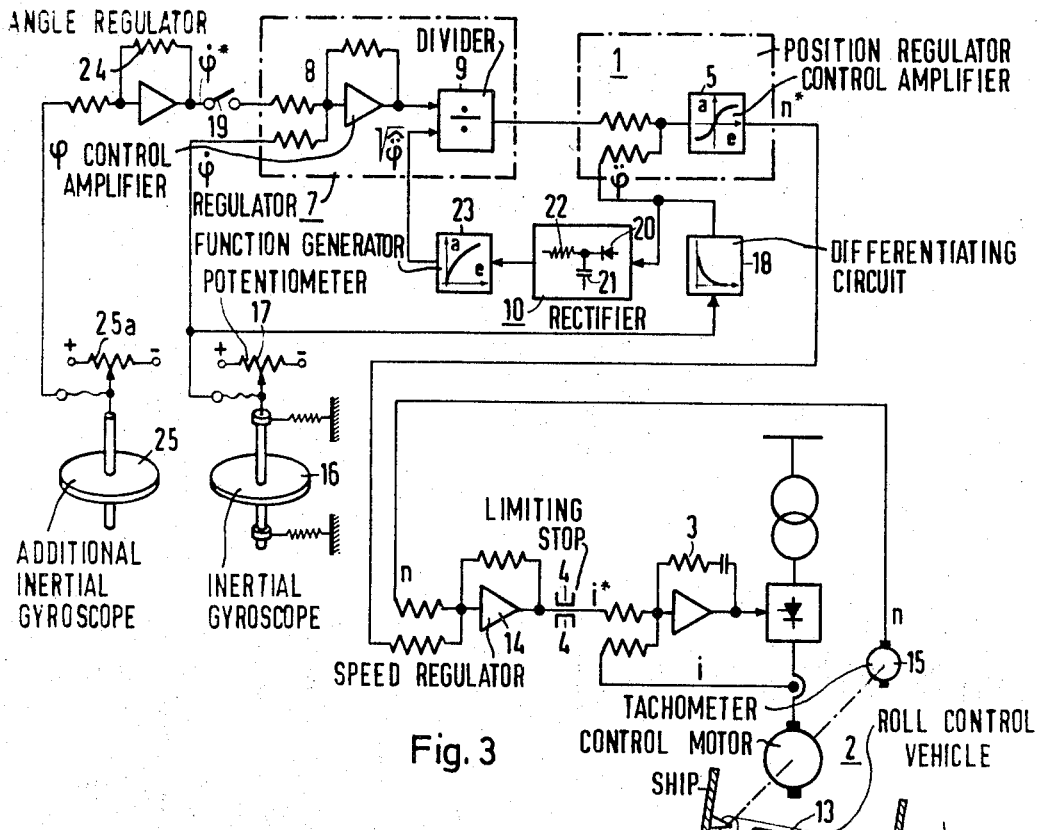
FIG. 3 is a block diagram of a modification of the closed-loop regulating system of the invention utilized for roll stabilization of ships.

In FIG. 1, a regulated control drive comprises a position regulator 1 and a control motor 2. The control motor 2 has a rotary speed $n$ revolutions per minute and a current $i$. The current-proportional acceleration $b$ of the rotary speed and current of the control motor 2 are each regulated in an inside control loop with the systems of a speed regulator 11 and a current regulator 3 in accordance with the auxiliary datum or reference speed $n^*$ and the auxiliary datum or reference current $i^*$ for the regulators.

The actual or pilot speed magnitude $n$ is provided by a tachometer or tach generator Ta which is mechanically coupled to the control motor 2. The pilot or actual current magnitude $i$ is provided by a current transformer CT connected in the armature circuit of the control motor 2. A reduction gear G is coupled to the output shaft of the control motor 2. The output of the speed regulator 11 is limited on both sides to maximum magnitudes by two limiting stops 4, so that said speed regulator functions as an acceleration-limited control drive.

In order that the acceleration-limited control drive have an optimum speed, that is, in order that the regulation or adjustment of an occurring position control deviation $\Delta$ is always effected with the maximum feasible current or the maximum acceleration, the position regulator 1 includes a specifically designed control amplifier 5. The control amplifier 5 of the position regulator 1 is so designed, in a known manner, that its amplification or gain is always in inverse proportion to its output voltage. That is, the output voltage $a$ of the control amplifier 5 depends upon the input voltage $e$ of said control amplifier in accordance with the function curve illustrated in the block representing said control amplifier. The input-output voltage characteristic $ea$ of the control amplifier 5 follows the equation $$a = \pm \sqrt{e \sin e}.$$

The input-output voltage characteristic curve of the control amplifier 5 may be provided in a known manner by a feedback electronic amplifier having a feedback circuit which includes a plurality of biased threshold diodes connected in parallel with each other. The output of the position control circuit has a control magnitude $s$ which controls a storage member 6 of a control circuit. The storage member 6 includes an integrating storage member or memory having an integrating time or a time constant T.

A datum or reference magnitude $s^*$ is provided by a regulator 7 and is supplied in the output of said regulator. The position regulator 1 is subsidiary or ancillary to the regulator 7. The regulator 7 functions to control or regulate the actual control magnitude $x$. The control magnitude $x$, in accordance with usage, defines, for example, the flow volume of a liquid, gas or gaseous medium, in which case the reference magnitude $s$ determines the valve stroke of the valve member which releases the flow. The control magnitude may also be the pressure in a gas-filled container.

The regulator 7 comprises a control amplifier 8 having an input circuit. The difference between the reference magnitude $s^*$ and the pilot or actual magnitude $x$ of the control magnitude is provided in the input circuit of the control amplifier 8 of the regulator 7. The output of the control amplifier 8 is connected to the input of a quotient former or divider 9. The divisor input of the divider 9 is supplied with a magnitude derived from the control deviation $\Delta$ of the control amplifier 5 of the position regulator 1.

An amplitude-measuring instrument 10 is connected in a feedback circuit between the output of the control amplifier 5 of the position regulator 1 and an input of the divider 9 of the regulator 7. The amplitude-measuring instrument 10 functions to insure that the corresponding maximum magnitude of the control deviation $\Delta$, which is usually the magnitude occurring at the onset of a load or a reference value impact, acts upon the divider 9. As a result of the effect of the corresponding maximum magnitude of the control deviation $\Delta$ on the divider 9, the amplification of the regulator 7 is decreased, depending upon the degree of overcontrol.

The importance of the foregoing features of the invention is illustrated in FIGS. 2a, 2b and 2c. FIG. 2a illustrates the curve of the actual output magnitude s of the position control circuit after an abrupt change of the reference output magnitude $s^*$, which is assumed to occur at an instant of time $t_0$. In each of FIGS. 2a and 2b, the abscissa represents the time $t$ and the ordinate represents the output magnitude $s$.

In FIG. 2a, at the time instant $t_0$, the maximum control deviation $\hat{\Delta}$ occurs as a difference between the reference magnitude and the actual magnitude of the position control circuit. Since the acceleration $b$ of the control motor 2 is limited, the speed $n$ of said control motor increases, first linearly with time, and second, due to the optimum speed design, decreases linearly commencing at the time instant $t_1$ and continuing until the time instant $t_2$. At the time instant $t_2$, the control motor 2 comes to rest and the actual output magnitude $s$ reaches the reference output magnitude $s^*$.

The parabolic portion of FIG. 2a is provided for the time curve of the output magnitude $s$. The control area is generally characteristic of the dynamics of a regulation or control system, that is, the area between the curve $s$ of the actual output magnitude and the linear curve $s^*$ of the reference output magnitude. With regard to control dynamics, the parabolic characteristic $s$ may be approximated by the curve 12 which is an exponential function moving toward the reference output magnitude curve $s^*$, provided said exponential function has the same control area as the parabolic characteristic. The exponential function 12 of FIG. 2a has a substitute time constant $\sigma$. The substitute time constant $\sigma$ is defined as $$\sigma = t_1 = k\sqrt{\hat{\Delta}}$$

wherein $k$ is a constant. The substitute time constant $\sigma$ is thus proportional to the root of the control deviation $\hat{\Delta}$ in optimum speed control drives of the type of FIG. 1.

FIG. 2b illustrates the conditions prevailing at a small reference value of magnitude impact $s^*$. The same values or magnitudes are in effect for the maximum acceleration. In contrast with the conditions illustrated in FIG. 2a, a considerable reduction in the substitute time constant $\sigma$ results in FIG. 2b. The subsidiary or ancillary position control circuit comprises the components 1, 2, 3, 4 and 11 and functions with regard to the control dynamics as a time constant member shown in FIG. 2c.

FIG. 2c illustrates a time constant member having a frequency response $$1/(1p\sigma)$$

wherein the time constant $\sigma$ depends upon the amplitude for the maximum magnitude of the occurring control deviation $\Delta$. This dependence is square in acceleration-limited control drives, corresponding to the foregoing equation, and is linear in speed-limited control drives.

The entire control or regulating circuit shown in FIG. 1 thus functions as a proportional regulating system which loads an integrating storage member having an integrated time T via a time constant member and the aforedescribed substitute time constant $\sigma$. A well damped or attenuated optimum regulating system for such a control circuit requires that the proportional amplification in said control circuit be inversely proportional to the substitute time constant $\sigma$. The type of inverse variations of the amplification of the regulator 7 shown in FIG. 1, which depends upon a magnitude corresponding to the substitute time constant $\sigma$, permits the immediate consideration of the variations in said substitute time constant due to the occurrence of variable amplitudes $\hat{\Delta}$, in order to provide a constantly optimum regulating or control operation.

FIG. 3 illustrates a modification of the closed-loop regulating system of the invention utilized for roll stabilization of seagoing vessels or ships. The purpose of the regulating system of FIG. 3 is to counteract the heeling or listing torques caused by the wind or waves. The wind or waves cause the ship to roll or tilt toward the surface of the sea to a rolling angle $\phi$. The countereffect or stabilization is provided by a motorized displacement of a weight vehicle 13 in directions perpendicular to the stem-to-stern axis of the ship.

An acceleration-limited control drive which is regulated or controlled in a subsidiary or ancillary loop is provided for controlling the displacement of the vehicle 13 in the ship from starboard to port or port to starboard. The control drive comprises the essential elements of the regulating system shown in FIG. 1. The position regulator 1 for the control drive comprises a control amplifier 5 having an amplification which is inversely proportional to its output voltage.

The output signal of the control amplifier 5 of the position regulator 1 functions as a reference value or magnitude $n^*$ in the input circuit of a subsidiary speed regulator 14. The armature voltage of the control motor 2 is also supplied to the input of the speed regulator 14 as an actual or pilot value signal $n$ via a tachometer 15 which couples said control motor to said speed regulator. The output signal of the speed regulator 14 is the reference value or magnitude $i^*$ of a subsidiary or ancillary current regulator and is limited by limiting stops 4, as in the embodiment of FIG. 1.

Due to the square characteristic of the control amplifier 5 and the limiting stops 4, the control drive is rated for optimum speed, so that it always rotates at a maximum possible acceleration, to regulate a control deviation. The actual value for the position control circuit may be, analogously to the regulating system of FIG. 1, a magnitude proportional to the displacement $s$ of the roll control vehicle 13. We have found, however, in view of the periodically occurring wave forces of the sea, that it is advantageous to supply the control amplifier 5 with a magnitude or value proportional to the roll acceleration and supplied as a pilot value.

The magnitude proportional to the roll acceleration is obtained by a spring-biased inertial gyroscope or centrifuge 16. The axis of the inertial gyroscope 16 displaces a movable tap contact of a potentiometer 17. The potentiometer 17 is energized by a direct voltage. A magnitude may therefore be derived from the potentiometer 17 which is proportional to the angular or roll velocity $\dot{\phi}$ of the vessel. A differentiating circuit 18 differentiates the signal provided by the potentiometer 17 to provide a magnitude proportional to the angular or roll acceleration $\ddot{\phi}$.

The roll acceleration $\ddot{\phi}$ is supplied via an input resistance to the control amplifier 5 of the position regulator 1. A point contact rectifier 10 is connected to the output of the differentiating circuit 18 and functions to measure the amplitude or the highest occurring instantaneous value of the roll acceleration $\ddot{\phi}$ of the vessel. The rectifier 10 substantially comprises a diode 20, which functions as a low-resistance load current circuit for a capacitor 21 and a high ohmic resistor 22. The capacitor 21 may discharge via the diode 20 only at a slow rate. During the application of an impactlike or pulsating voltage, the capacitor 21 of the rectifier 10 discharges in a known manner to the corresponding peak value of the effective input signal.

The output of the rectifier 10 is connected to the input of a function generator 23 which reproduces in a quadrant, the function $$a = \sqrt{e}$$

so that said function generator produces a magnitude which is proportional to the amplitude of the roll acceleration $\ddot{\phi}$. The magnitude or signal proportional to the amplitude of the roll acceleration $\ddot{\phi}$ is supplied to the divisor input of a divider or quotient former 9. In this manner, each increase in the effective time constant of the load control circuit is counterbalanced by an inverse variation of the amplification of the regulator 7.

As shown in the regulating system of FIG. 3, the regulator 7 for the roll velocity $\dot{\phi}$ may be combined with a subsidiary or ancillary regulator for the roll angle $\phi$. The combination of the regulator 7 with an angle regulator 24 may be effected by the closing of a switch 19. The angle regulator 24 produces an output signal $\phi^*$ which is supplied to the input of the regulator 7 as the reference value. The actual value or magnitude of the angle regulator 24 is also provided at the movable tap contact of a potentiometer 25a. The potentiometer 25a is energized by direct voltage. The movable tap contact of the potentiometer 25a is displaced under the control of an additional inertial gyroscope or centrifuge 25.

Figure 4:
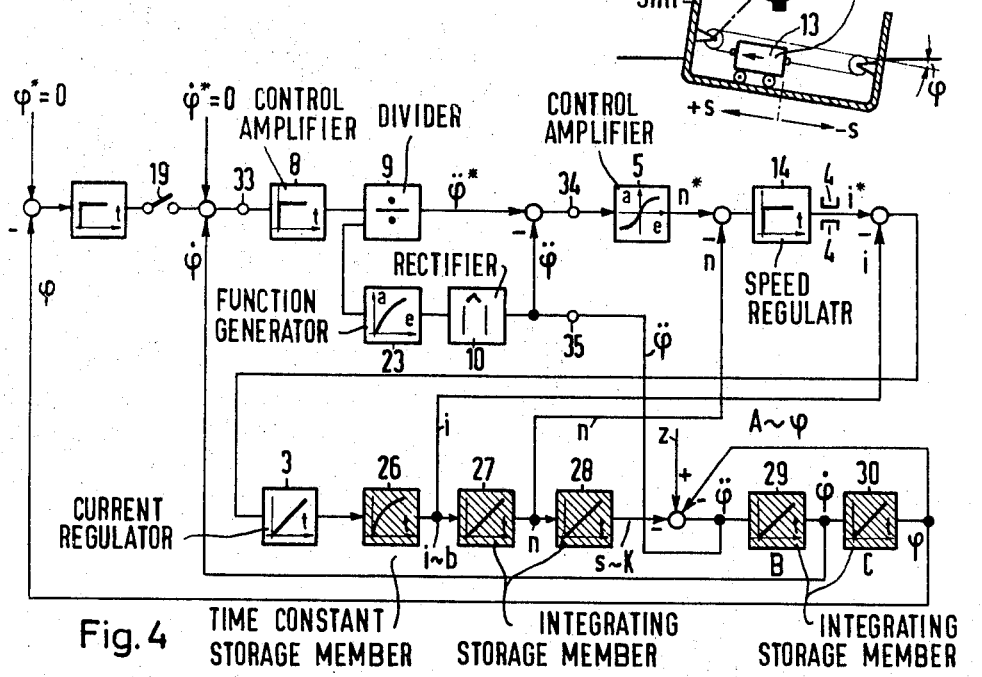
FIG. 4 is a block diagram of the control path of FIG. 3 in detail.

FIG. 4 illustrates the details of the control path of the regulating system of FIG. 3. The control path of FIG. 4 comprises five storage members, indicated by hatched lines. The five storage members include a time constant storage member 26 and four integrating storage members 27, 28, 29 and 30. The time constant storage member 26 defines the armature circuit constant of the control motor 2. The integrating storage members 27 and 28 provide the integral correlation between the acceleration $b$ of the roll control vehicle 13 and the velocity or speed $n$ of the control motor 2, as well as the correlation between said motor speed and the displacement path $s$ of said roll control vehicle.

The integrating storage member 29 has a frequency response $1/pB$, wherein B is the integrating time. The integrating storage member 30 has a frequency response $1/pC$, wherein C is the integrating time. The integrating storage members 29 and 30 provide the relationship between the roll angle $\phi$, the roll velocity $\dot\phi$ and the roll acceleration $\ddot\phi$. The integrating storage members 29 and 30 represent the ship or vessel itself, that is, the actual control path. In a basic or fundamental illustration of FIG. 1, the integrating storage members 29 and 30 would correspond to the integrating storage member 6 of the control circuit.

The ship is subjected to a disturbing force $z$ which results from the waves and which is counteracted, in a stabilizing sense, by a buoyancy force A proportional to the roll angle $\phi$. The effect of the stabilizing buoyancy force should be supported by a force K proportional to the displacement path $s$ of the roll control vehicle 13. Each of the storage members 26, 27, 28, 29 and 30 is provided with a control loop having an auxiliary current control magnitude $i$, an auxiliary speed control magnitude $n$, a roll acceleration magnitude $\ddot\phi$ and a roll velocity magnitude $\dot\phi$. When the switch 19 is closed, the control loop of each of the storage members 26 to 30 also has the roll angle magnitude $\phi$.

The control amplifier 5 of the position regulator 1, which is subsidiary or ancillary to the control drive, may also be provided, instead of the roll acceleration magnitude $\ddot\phi$ with a pilot value magnitude proportional to the displacement path $s$ of the roll control vehicle 13. This would not alter anything in the basic operation of the regulating system of FIG. 3. As indicated by the signal flow diagram of FIG. 4, it is preferable to select for the foregoing purposes a magnitude proportional to the roll acceleration $\ddot\phi$, derived immediately from the location of the disturbing forces, thereby providing a considerably more direct and rapid control of the roll motion caused by such disturbing forces.

If the roll or rolling motion of the vessel is to be compensated or corrected by adjustment of stabilizing floats, the control motor 2 of FIG. 3 may be utilized to damp or attenuate the effect of said roll by adjusting the angle or pitch of such floats. Nothing is altered thereby in the basic structure. The produced magnitude is effective only at the output of the integrating storage member 28 and is proportional to the adjustment of the floats and to the stabilizing forces exerted by said floats. Analogous considerations apply also to cases in which stabilization is provided by a system of stationary tanks in the vessel, in which system, quantities of water are displaced between various tanks by pumps.

Figure 5:
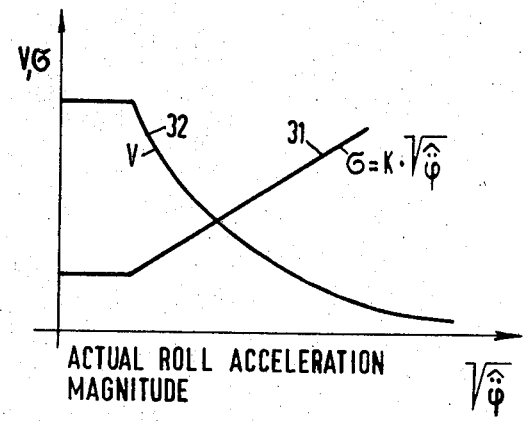
FIG. 5 is a graphical illustration of the relationship between the actual roll acceleration magnitude $\ddot{\phi}$ and the substitute time constant $\sigma$.

FIG. 5 illustrates, in curve 31, the relationship between the actual magnitude of the roll acceleration $\ddot\phi$ and the substitute time constant $\sigma$, with regard to the regulating system of FIGS. 3 and 4. In FIG. 5, the abscissa represents the actual magnitude of the roll acceleration $\ddot\phi$ and the ordinate represents the substitute time constant $\sigma$. As indicated in FIG. 5, at low magnitudes of the roll acceleration $\ddot\phi$, the substitute time constant $\sigma$ is also small and of constant magnitude, since the acceleration at small magnitudes or amplitudes does not reach the limitation of acceleration. On the other hand, if there is a limitation on the acceleration, the substitute time constant $\sigma$ conforms to the equation $$\sigma = k\sqrt{\frac{\ddot\phi}{\phi}}$$

In FIG. 5, the ordinate also represents the optimum amplification $V$ of the control amplifier 8 of the regulator 7 (FIGS. 1 and 3). The optimum amplification $V$ of the control amplifier 8 is $$V = B/2\sigma - \sigma/C$$

wherein B is the integrating time of the integrating storage member 29 and C is the integrating time of the integrating storage member 30 (FIG. 4).

In FIG. 5, curve 32 illustrates the optimum amplification function $V$. Usually, the integrating time C is long relative to the substitute time constant $\sigma$, so that the term $\sigma/C$ of the foregoing equation is unimportant and may therefore be ignored in providing the amplification function. When the foregoing equation must be fulfilled exactly in order to comply with the specific requirements relative to the dynamics and the damping of the control circuit of FIG. 4, a modification or variation may be utilized. The modification or variation is that shown in FIG. 6 and connected between terminals 33, 34 and 35.

Figure 6:
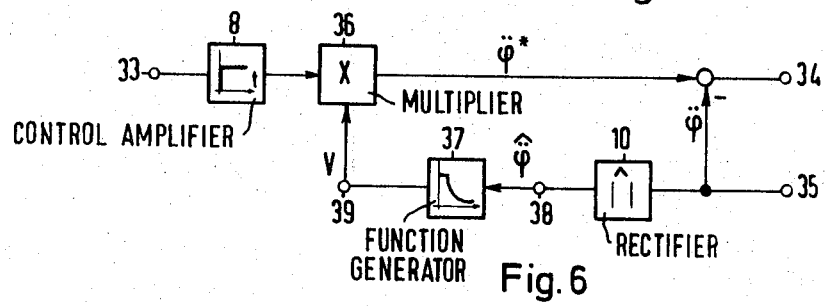
FIG. 6 is a modification of part of the circuit arrangement of FIG. 4.

In FIG. 6, the control amplifier 8 and the rectifier 10 are the same as the control amplifier 8 and the rectifier 10 of the system of FIG. 4. The divider 9 of FIG. 4 is replaced in FIG. 6 by a multiplier 36 having an input which is supplied by the output of a function generator 37 connected between terminals 38 and 39. An input voltage applied to the function generator 37 has a magnitude corresponding to the amplitude of the actual roll acceleration $\ddot\phi$. The function generator 37 is provided with a characteristic which is such that the output signal $V$ of said function generator complies with the foregoing equation. The square root extracting function generator 23 of FIG. 4 may be eliminated, since its function may be provided by the function generator 37 of FIG. 6.

Figures 7, 8:
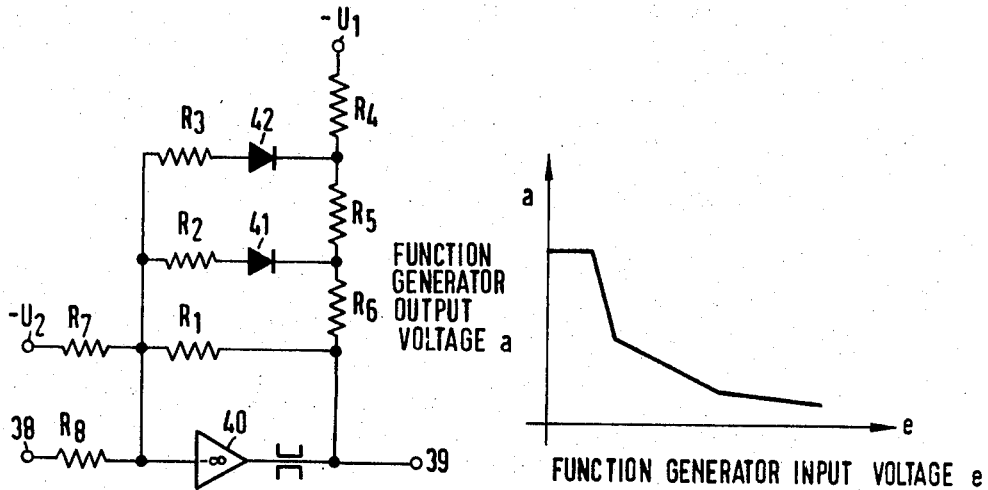
FIG. 7 is a circuit diagram of a function generator which may be utilized as the function generator 37 of FIG. 6.
FIG. 8 is a graphical representation of the characteristic of the function generator of FIG. 7.

FIG. 7 is a circuit of an embodiment of a function generator which may be utilized as the function generator of FIG. 6. The function generator of FIG. 7 comprises an output-limited electronic amplifier 40 having a feedback circuit which includes a resistor $R_1$. An additional resistor $R_2$ is connected in series circuit arrangement with a biased threshold diode 41 and a resistor $R_6$, and said series circuit arrangement is connected in parallel with the feedback circuit comprising the resistor $R_1$. An additional resistor $R_3$ is connected in series circuit arrangement with a biased threshold diode 42 and a resistor $R_5$, and said series circuit arrangement is connected in parallel with the feedback circuit comprising the resistor $R_1$, via the resistor $R_6$. The bias voltage for the threshold diodes 41 and 42 is provided by a DC voltage source $-U_1$ which is connected to the output of the amplifier 40 via the resistors $R_4$, $R_5$ and $R_6$ connected in series circuit arrangement with each other.

In FIG. 7, an additional DC voltage source $-U_2$ of the same polarity as the DC voltage source $-U_1$ energizes the amplifier 40 with a constant current via an input resistor $R_7$. The voltage derived from the pilot value signal of the roll acceleration $\ddot\phi$ is applied to the terminal 38 and is fed to the amplifier via a resistor $R_8$.

FIG. 8 illustrates the input voltage versus output voltage characteristic of the function generator 37 of FIG. 7. In FIG. 8, the abscissa represents the input voltage $e$ of the function generator of FIG. 7 and the ordinate represents the output voltage of a said function generator. When the input voltage $e$ increases, the threshold diodes 41 and 42 are switched to their conductive condition, in sequence, and thereby contribute toward a reduction in amplification, that is, a reduction in the slope of the characteristic curve. An increase in the number of threshold diodes permits a substantially exact approximation of the desired function.

While the invention has been described by means of specific examples and in specific embodiments, we do not wish to be limited thereto, for obvious modifications will occur to those skilled in the art without departing from the spirit and scope of the invention.

We claim:

1. A closed-loop regulating system for a control circuit having a control loop for controlling said regulating system and a control drive which is limited in speed and acceleration, said regulating system comprising a regulator having an input, an output for providing an output voltage and an amplifier providing amplification of a signal supplied thereto and having an amplifying gain inversely proportional to the output voltage; a control drive including a position regulator having an input connected to the output of said regulator and an output; and a subsidiary control loop including the regulator and the position regulator for controlling said control drive, wherein the amplitude of a magnitude depending upon the input signal of said position regulator inversely controls the amplification of said regulator.

2. A closed-loop regulating system as claimed in claim 1, wherein said regulator comprises a divider having an input connected to the output of the amplifier thereof and another input coupled to the output of the position regulator of said control drive.

3. A closed-loop regulating system as claimed in claim 1, wherein said regulator comprises a multiplier having an input connected to the output of the amplifier thereof and another input, and a function generator having an output connected to the other input of said multiplier.

4. A closed-loop regulating system as claimed in claim 1, wherein said control drive includes a point contact rectifier for providing a control signal for the regulator and means for charging said rectifier with the input signal of said regulator.

5. A closed-loop regulating system as claimed in claim 1, wherein the position regulator of said control drive comprises a control amplifier having an amplification which is inversely proportional to the output voltage of the amplifier of the regulator and means for supplying the output signal of said control amplifier to said regulator to control the amplifier of said regulator.

6. A closed-loop regulating system for damping the rolling of a ship having a control loop for controlling said regulating system and a control drive which is limited in speed and acceleration, said regulating system comprising a regulator having an input, an output and an amplifier providing amplification of a signal supplied thereto; a control drive limited in speed and acceleration, said control drive including a position regulator having an input connected to the output of said regulator, an output and a control amplifier connected between the input and output thereof and having an amplification inversely proportional to its output voltage, a point contact rectifier for providing a control signal for the regulator, means for charging said rectifier with the input signal of said regulator and a function generator connected between said point contact rectifier and said regulator and having a amplification proportional to its output voltage, said function generator being charged via said point contact rectifier by the actual value of said regulator provided for said control drive, said function generator affecting the amplification of said regulator; and a subsidiary control loop including said rectifier and said function generator for controlling said control drive, wherein the amplitude of a magnitude depending upon the input signal of said position regulator inversely controls the amplification of said regulator.

7. A closed-loop regulating system as claimed in claim 3, wherein said subsidiary control loop provides an input signal for the position regulator of said control drive and said input signal is supplied to the other input of the multiplier of said regulator.

8. A closed-loop regulating system as claimed in claim 3, wherein the function generator of said regulator comprises an electronic amplifier having a feedback circuit comprising a pair of parallel branches each of which includes a threshold diode connected in series circuit arrangement with a resistor, and means for biasing the threshold diodes with variable direct voltages.

9. A closed-loop regulating system as claimed in claim 6, wherein the actual value of the regulator is a magnitude proportional to the roll velocity of the ship.

10. A closed-loop regulating system as claimed in claim 9, further comprising an angle regulator for the roll angle of the ship connected to the input of said regulator.

11. A regulating system comprising a first regulator including an amplifier and having an output voltage, an amplifying gain which is inversely proportional to its output voltage and a control drive; and a second regulator including an amplifier superimposed on the first regulator in a manner whereby the amplitude of the output voltage of the first regulator inversely controls the amplification of the second regulator.

* * * * *